UNITED STATES PATENT OFFICE.

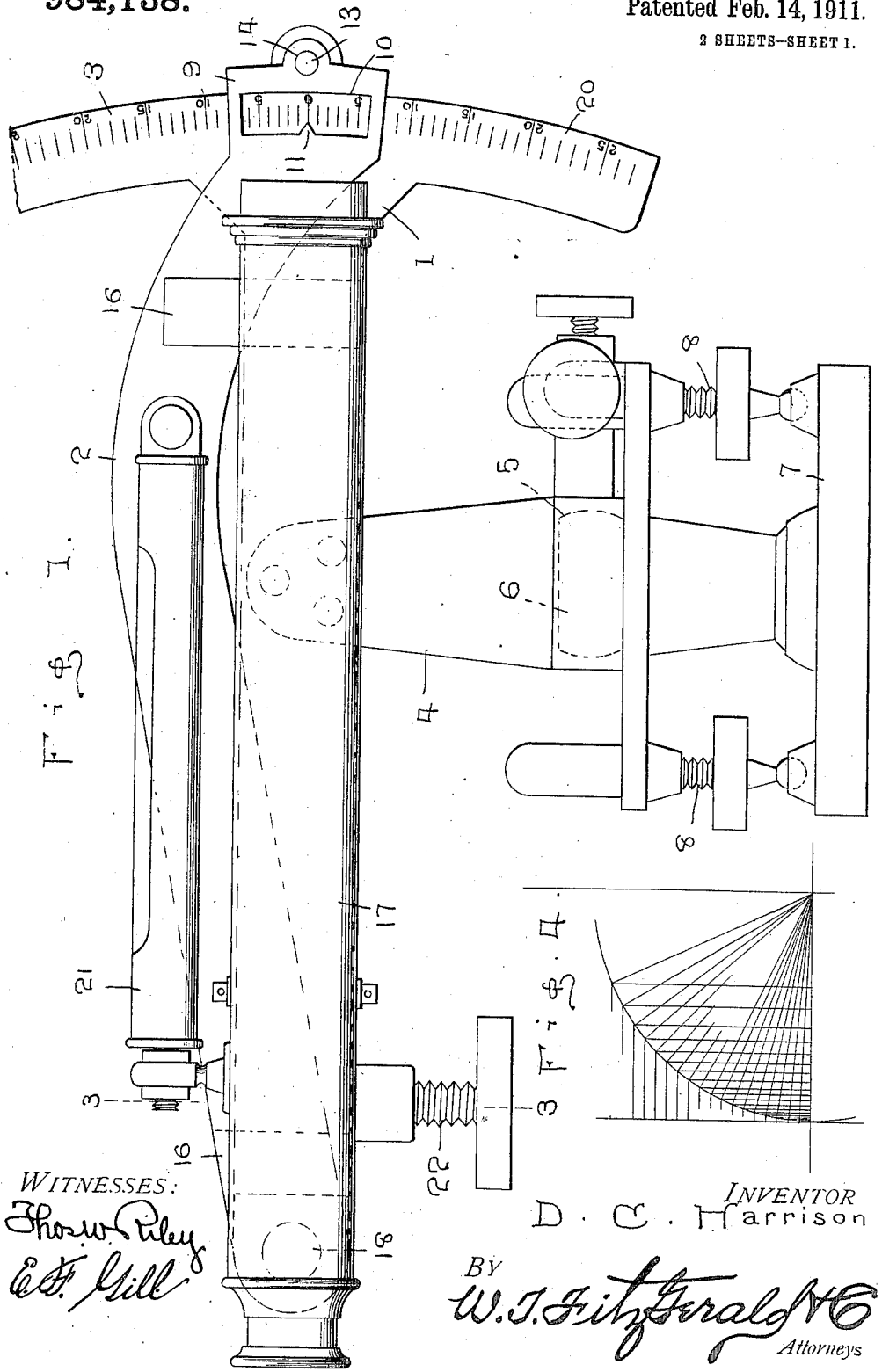

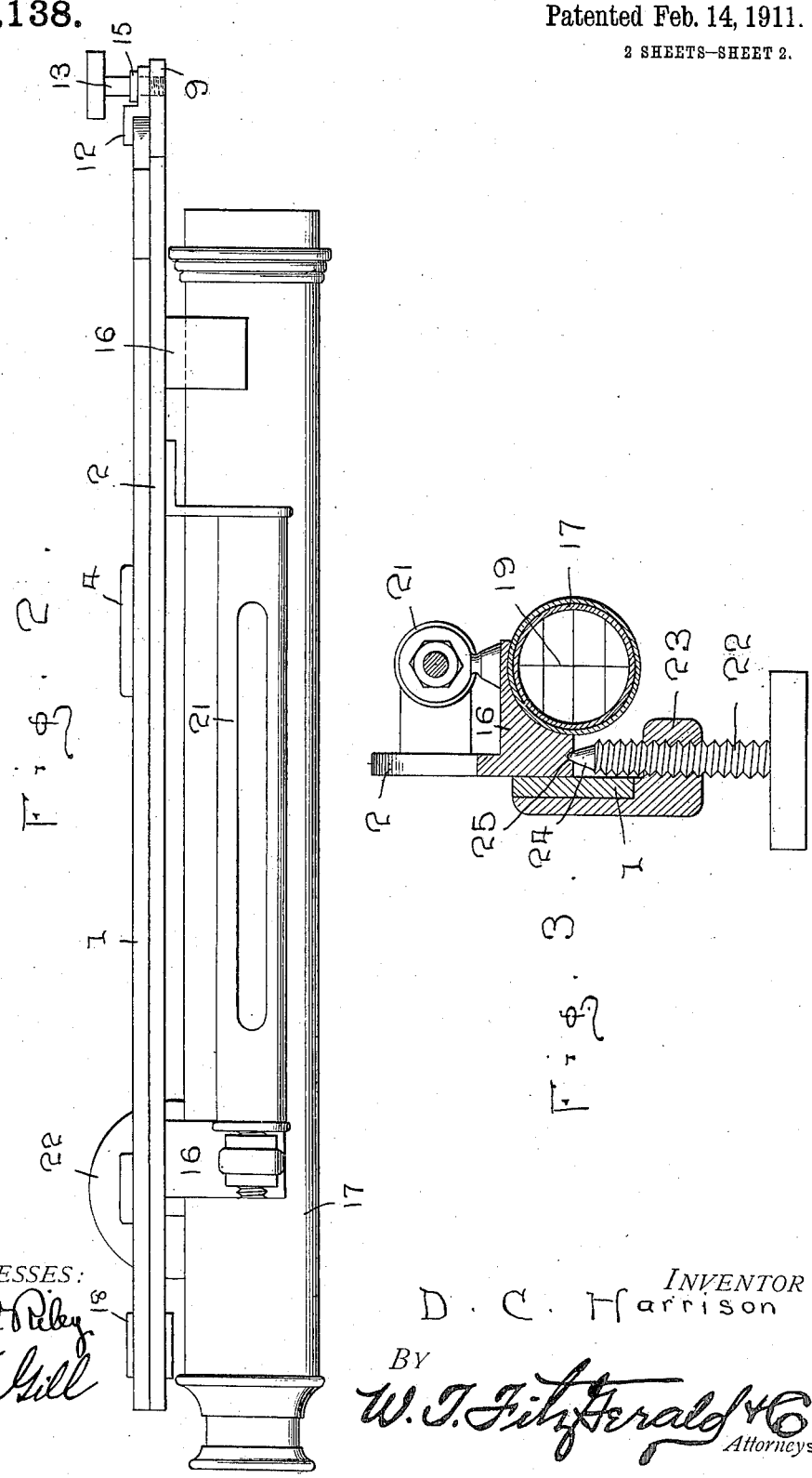

DABNEY C. HARRISON, OF WASHINGTON, DISTRICT OF COLUMBIA.

SURVEYING INSTRUMENT.

984,138.  Specification of Letters Patent.  Patented Feb. 14, 1911.

Application filed June 30, 1908. Serial No. 441,153.

*To all whom it may concern:*

Be it known that I, DABNEY C. HARRISON, a citizen of the United States, residing at Washington, District of Columbia, have invented certain new and useful Improvements in Surveying Instruments; and I do hereby declare the following to be a full, clear, and exact description of the invention, such as will enable others skilled in the art to which it appertains to make and use the same.

My invention relates to new and useful improvements in surveying instruments and more particularly to that class adapted to be used in constructing roadways, railway tracks, etc., and my object is to provide an instrument of this class whereby the ascending or descending grades may be obtained simultaneously with the bringing of an object at a distance into focus with the telescope of the instrument.

A further object is to provide a scale-carrying plate and arrange the same to extend above and below the beam of the instrument, whereby the per cent. of ascending or descending grades may be readily indicated.

A still further object is to provide graduations on said plate, said graduations being based on the sine of the angle.

A still further object is to provide means for swinging the telescope and parts of the instrument and a still further object is to provide means for locking the telescope in its adjusted position.

Other objects and advantages will be hereinafter referred to and more particularly pointed out in the claims.

In the accompanying drawings which are made a part of this application. Figure 1 is a side elevation of my improved instrument in its operative position. Fig. 2 is a top plan view thereof. Fig. 3 is a sectional view as seen on line 3—3, Fig. 1, and, Fig. 4 is a diagrammatic view showing the manner of determining the graduations to be placed on the scale.

Referring to the drawings in which similar reference numerals designate corresponding parts throughout the several views, 1 indicates a beam, on one end of which is pivotally mounted a protractor arm 2, the opposite end of said arm being adapted to move along a plate 3 carried at the forward end of the beam 1, said plate being curved to correspond to the radius of the swinging end of the arm 2, and extended at equal distances above and below the longitudinal center of the beam 1.

The beam 1 is supported by means of a standard 4, the upper end of said standard being secured to the base 1 in any preferred manner, while the lower end thereof is provided with a socket 5 into which extends a ball 6 carried by the usual or any preferred form of tripod base 7, the standard 4 being adjusted at various angles to the base 7 by means of adjusting screws 8.

The standard 4 is preferably tapered from the socket upwardly and is secured to the outer face of the beam 1, so that the arm 2 may readily swing without encountering the end of the standard and to allow the registering end of the arm 2 to swing below the beam 1, said arm is curved upwardly between its ends, thus permitting the registering end of the arm to descend a sufficient distance to register with the graduations on the lower portion of the plate 3.

The swinging end of the arm 2 is provided with a head 9, through which is formed an elongated opening 10 so arranged as to exhibit the graduations therethrough when the arm is raised or lowered, said head being formed at a point substantially midway the longitudinal center of the opening 10 with an indicating finger 11, which finger is adapted to coöperate with the graduations on the plate 3 to register the degree of angle of the swinging end of the arm 2 from the horizontal plane of the beam 1.

The head 9 extends beyond the outer edge of the plate 3 and is adapted to receive a clamp 12, one end of the clamp resting against the face of the projecting portion of the head, while the opposite end thereof overlaps and engages the outer face of the plate 3, whereby when said clamp is forced into engagement with the face of the head, the opposite portion of the clamp will firmly engage the face of the plate and hold the arm 2 in its adjusted position, said clamp being held in position on the head 9 by means of a binding bolt 13, one end of which is threaded into an opening 14 in the projecting portion of the head 9, so that when said bolt is turned inwardly, a collar 15 on the bolt will engage the clamp 12 and positively bind the same against the head 9 and plate 3.

Fixed to one face of the arm 2 in any preferred manner, as by means of straps 16 and extending longitudinally of said arm, is the usual or any preferred form of surveying telescope 17, which telescope is preferably the same length as the distance between the pivotal point 18 of the arm 2 and the curved plate 3, said telescope extending slightly beyond the pivoted end of the protractor arm, so that the eye may be readily placed at the ocular end of the telescope.

The telescope 17 is placed parallel with a line extending from the center of the pivot point 18 to the center of the finger 11 and is provided with the usual form of crossed wires 19, whereby the telescope may be quickly and accurately registered with an object at any distance from the objective end of the telescope and by locating the finger 11 in position to register with the center of the telescope, said finger will be in position to accurately register the per cent. of grade when the object is brought into registration with the crossed wires 19.

The plate 3 is preferably formed integral with the end of the beam 1 and is arranged as a sector or part of a circle, at the central point of which circle is to be placed the bearing point of the arm 2, so that the swinging end of the arm will swing in a circle coincident to the curvature of the plate 3. A scale 20 is provided on the inner face of the plate 3 and in a position to be exposed through the opening 10 in the arm 2, as said arm is swung upon its pivot.

The divisions of the scale are such as to give the exact per cent. of grade between the pivoted end of the arm 2 and the object upon which the telescope, carried by the arm, is focused, the position of the divisions being determined by dividing the sines of the angles indicated between the base bar and the protractor arm 2 by the distance from the index point of the arm 2 to the pivot point thereof, this distance being the radius of the curve of the plate 3.

In determining the divisions of the scale in this manner, said divisions will be of unequal distances apart, the space between the divisions gradually increasing from the beam 1 upwardly and downwardly or from zero toward each end of the plate and said divisions are preferably divided into multiples of five and numerals placed adjacent each fifth division, the scale being so located on the plate 3 as to register with the indicating finger 11 as the arm 2 is raised or lowered. By determining the divisions in this manner, the exact per cent. of grade between the pivot point of the arm and an object at a distance therefrom, may be instantly determined and read by moving the swinging end of the arm until the object is properly focused in the telescope, the division line with which the indicating point 11 registers, indicating the per cent. of grade.

It will further be seen that by extending the plate 3 above and below the horizontal center of the beam 1 designating the central graduations at zero and placing the multiples five or designating numerals, upwardly and downwardly on the plate from zero, the per cent. of ascending or descending grade may be obtained without changing the position of the base of the instrument.

It has been found in practice that a scale based on the tangent of the angle of the telescope will not give the proper per cent. of grade and to this end I have provided graduations based on the sine of the angle, which graduations gradually increase in distance apart as the scale ascends or descends from the base, thereby giving the exact per cent. of grade between the sight end of the telescope and the object on which the telescope is focused, it being understood of course that when the telescope is of greater or less length, the graduations are to be calculated and spaced accordingly.

In Fig. 4 of the drawings I have shown a diagrammatic view illustrating the difference of measurement between a scale based on the sine of an angle and a scale based on the tangent and from said scale it will be readily apparent that the tangent measurement will not give the proper per cent. of grade without computing the measurements in a manner well known in the art, while by using applicant's device, the per cent. of grade between an object at any distance from the ocular end of the telescope can be instantly ascertained by bringing the object into registration with the telescope.

In applying my improved instrument to use, the base 7 is first placed in position and the beam 1 leveled by means of the usual or any preferred form of spirit level 21, which level may be secured to the instrument in any preferred manner and when the level is attached to the parts of the instrument as shown in the present drawings, the finger 11 is first to be moved to zero and the arm held in this position by means of the clamping bolt 13, when the beam is then adjusted through the medium of the adjusting screws 8 until said beam is level. The bolt 13 is then loosened so that the arm 2 may readily swing on its pivot 18 and if the per cent. of grade is ascending, the arm 2 is swung upwardly until the telescope is properly focused on the object at a distance from the instrument and to more readily raise the arm, I have provided an adjusting screw 22, which screw extends through a threaded seat 23 carried by the beam, the upper end of said screw 22 being preferably pointed, as shown at 24 and adapted to enter a cavity 25 in the lower portion of the arm 2 and it will be readily seen that when the screw 22 is rotated in one direction, the arm 2 will be elevated, while when the screw is rotated in the opposite direction, the arm will be left free to descend and by providing said adjusting screw 22, a more accurate adjustment of the arm 2 may be accomplished. After the arm 2 has been moved to the proper position, it may be locked in this position by means of the clamp 12 and binding bolt 13, in which position the arm will be held until such time as it is desired to obtain a different observation.

When the instrument is not in use, the various parts may be brought to the position shown in Fig. 1 and thus occupy but a minimum amount of space, so that said instrument may be readily stored away or transported from place to place.

It will also be seen that by providing an instrument of this class and employing the graduations as shown, the per cent. of grade between the sight end of the telescope and an object at any distance therefrom may be instantly ascertained and read from the instrument, and it will likewise be seen that the instrument is equally applicable for ascertaining the per cent. of ascending or descending grades.

What I claim is:

1. In a surveying instrument the combination of a sighting means and a suitable support therefor, of a beam secured to said support, a scale integral with said beam and extending both above and below the longitudinal plane of said beam, a second beam pivoted at one extremity to said first named beam and having a sight opening in its free extremity registering with said scale, a pointer in said sight opening coöperating with said scale, and means for operating said pivoted beam.

2. In a surveying instrument, the combination with a beam; of a scale at one end of the beam and extending above and below the beam, means pivoted to the opposite end of the beam adapted to coöperate with the divisions of the scale, said divisions gradually increasing in distance apart ascending or descending from the beam and a telescope carried by the pivoted means, the ocular end of said telescope terminating adjacent the pivot point of said pivoted means.

3. A surveying instrument comprising the combination with a beam; of an arm pivoted to said beam, a telescope fixed to said arm, the ocular end of the telescope terminating adjacent to the pivotal point of said arm, and a scale extending above and below the beam adapted to coöperate with the swinging end of said arm to indicate the per cent. of ascending or descending grade between the ocular end of the telescope and an object at a distance therefrom, the divisions of said scale increasing in distance apart ascending or descending from a given point.

4. In a surveying instrument, the combination with a beam having a plate at one end thereof extending above and below said beam, said plate having a scale thereon, the divisions of which gradually increase in distance apart from the beam; of an arm pivotally secured to the opposite end of said beam and having its free end in position to coöperate with the divisions of the scale, whereby the per cent. of ascending or descending grade may be ascertained by raising or lowering said arm from the beam and a telescope on said arm adapted to be focused on an object and thereby determine the position to which the arm is to be moved, the ocular end of the telescope being positioned near the pivotal point of said arm.

5. In a surveying instrument, the combination with a beam having a curved plate at one end thereof, said plate extending above and below the beam and having a scale thereon; of an arm pivoted to said beam and having its free end in a position to move over said graduations and co-incident to the curvature of said plate and a sighting device connected to said arm.

6. In a surveying instrument, the combination with a beam having a plate at one end thereof extending above and below the beam and a scale on said plate; of a curved arm pivoted at one end to said beam and having its opposite end in position to travel over said graduations and co-incident to the curvature of said plate and a sighting device connected to said arm.

7. In a surveying instrument, the combination with a beam having a curved plate at one end thereof, said plate extending above and below the beam and having a scale thereon; of an arm pivoted to the beam at the end opposite the scale, said arm being curved between its ends, the free end of said arm having a slot therethrough, through which the scale may be read, an indicator point and means adapted to clamp the end of the arm in engagement with the curved plate to hold said arm against swinging movement and a sighting device connected to said arm.

In testimony whereof I have signed my name to this specification in the presence of two subscribing witnesses.

DABNEY C. HARRISON.

Witnesses:
E. F. HEAD,
C. S. FRYE.